United States Patent Office 3,014,949
Patented Dec. 26, 1961

3,014,949
OXO PHOSPHATES, PHOSPHONATES AND PHOSPHINATES
Gail H. Birum and James L. Dever, Dayton, Ohio, assignors to Monsanto Chemical Company, St. Louis, Mo., a corporation of Delaware
No Drawing. Filed Sept. 26, 1958, Ser. No. 765,696
25 Claims. (Cl. 260—461)

The present invention relates to organic phosphorus compounds and more particularly provides a new and valuable class of oxo phosphorus esters and the method of producing the same.

According to the invention, the oxo esters are prepared either by reacting an α-diketone with a trivalent phosphorus ester to obtain a 1:1 adduct thereof and then contacting the adduct with a hydrogen donor selected from the class consisting of inorganic mineral acids, fatty acids, benzenoid mono-carboxylic acids of from 7 to 10 carbon atoms, and water, or by reacting the α-diketone with the phosphorus ester in presence of the hydrogen donor. Preparation of the adducts forms the subject matter of our copending application, Serial No. 763,445, filed of even date. Briefly, the adducts are prepared by simply mixing the diketone with the ester at ordinary or moderately increased temperature and allowing the resulting reaction mixture to stand until formation of the adducts has occurred. Generally, the reaction is exothermic and the adducts are formed almost instantaneously, i.e., by simply adding one component to the other. Reaction of the trivalent phosphorus compound with the α-dicarbonylic compound to form the presently useful adducts takes place according to the scheme:

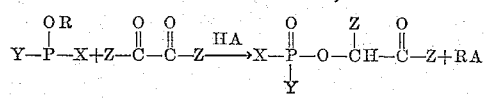

wherein R is selected from the class consisting of hydrocarbyl and halohydrocarbyl radicals free of olefinic and acetylenic unsaturation and containing from 1 to 12 carbon atoms, Z is a hydrocarbyl radical free of olefinic and acetylenic unsaturation and containing from 1 to 12 carbon atoms, and X and Y are selected from the class consisting of R and OR.

Upon treating the above 1:1 adducts with the hydrogen donor, formation of the oxo compound takes place substantially according to the scheme:

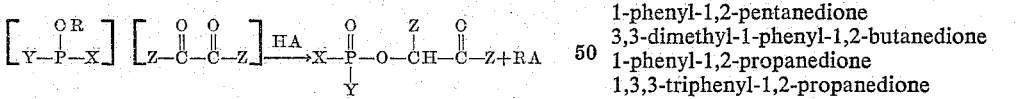

in which, X, Y, R and Z are as herein defined and A denotes a radical which, together with the H, completes the molecule of said hydrogen donor.

When water is the hydrogen donor, the by-product is ROH, i.e., an alcohol or phenol, depending upon the nature of the trivalent phosphorus constituent of the adduct. When a mineral acid, e.g., hydrochloric or sulfuric acid, is used as the hydrogen donor, the product is an organic chloride or sulfate, e.g., ethyl chloride or isopropyl sulfate. The by-product obtained when the hydrogen donor is a carboxylic acid is an ester, i.e., it has the formula TCOOR where TCOO— denotes the acid residue of the carboxylic acid, e.g., the use of acetic acid gives acetates and of benzoic acid, benzoates. The present invention thus provides a method of preparing carboxylic esters without the concomitant formation of water.

Conveniently, the presently provided oxo compounds are also obtained by conducting the reaction of the diketone and the trivalent phosphorus ester in the presence of the hydrogen donor. The adduct is formed merely as an intermediate which is not isolated, thus:

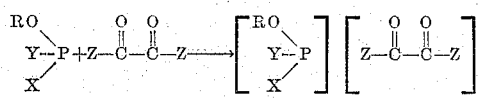

A very valuable class of dicarbonylic compounds which are useful for the preparation of either the adducts or the oxo phosphates includes the α-alkanediones of from 4 to 26 carbon atoms, e.g., 2,3-butanedione
2,3-pentanedione
4-methyl-2,3-pentanedione
3,4-hexanedione
2,2,5,5-tetramethyl-3,4-hexanedione
2,3-hexanedione
5-methyl-2,3-hexanedione
4,5-octanedione
2,3-octanedione
2,7-dimethyl-4,5-octanedione
3,4-heptanedione
5,6-decanedione
3,4-decanedione
5,6-dodecanedione
10,11-eicosanedione
13,14-hexacosanedione
4-methyl-2,3-decanedione
2,3-undecanedione
2-methyl-6,7-octanedione
3,4-nonanedione
2,5-dimethyl-3,4-hexanedione
2-methyl-5,6-heptanedione
11,12-tetracosanedione Another valuable class of dicarbonylic compounds which, according to the invention, form 1:1 adducts with the presently disclosed trivalent phosphorus compounds or can be used with the phosphorus esters and the hydrogen donors to give the oxo phosphates are the aryl- or cycloalkyl-substituted α-alkanediones, e.g., 1-phenyl-1,2-pentanedione
3,3-dimethyl-1-phenyl-1,2-butanedione
1-phenyl-1,2-propanedione
1,3,3-triphenyl-1,2-propanedione
1,3-diphenyl-1,2-butanedione
1,4-diphenyl-1,2-butanedione
3-methyl-1-phenyl-1,2-butanedione
1-phenyl-1,2-butanedione
1,4-diphenyl-2,3-butanedione
3,3-dimethyl-(2,4-xylyl)-1,2-butanedione
1-mesityl-3,3-dimethyl-1,2-butanedione
3-cyclohexyl-1-phenyl-1,2-propanedione
1-(β-naphthyl)-8,9-hexadecanedione Still another class of α-dicarbonylic compounds which give the presently useful 1:1 adducts or may be used with the trivalent phosphorus ester and the hydrogen donor to give the present oxo phosphates includes benzil and the binaphthoyls and their hydrocarbon derivatives, e.g., o-, m- or p-tolil, etc.

An especially useful class of trivalent phosphorus esters which reacts with the above-mentioned α-dicarbonylic compounds, according to the invention, comprises the phosphite triesters of the formula P(OR)₃ where R is a hydrocarbon or a halohydrocarbon radical which is free of olefinic and acetylenic unsaturation and contains from 1 to 12 carbon atoms. Examples of such triesters are:

Trimethyl phosphite
Triethyl phosphite
Tris(2-chloroethyl) phosphite
Triisopropyl phosphite
Tris(3,4-dichlorobutyl) phosphite
Tri-n-amyl phosphite
Tri-n-hexyl phosphite
Tris(2-ethylhexyl) phosphite
Tridodecyl phosphite
3-bromopropyl diethyl phosphite
Dimethyl ethyl phosphite
Butyl diethyl phosphite
Amyl di-n-octyl phosphite
Ethyl methyl propyl phosphite
Butyl 2-iodoethyl phenyl phosphite
Triphenyl phosphite
Tris(4-chlorophenyl) phosphite
Tri-p-tolyl phosphite
Tris(o-ethylphenyl) phosphite
Tribenzyl phosphite
Trinaphthyl phosphite
Dibutyl phenyl phosphite
Di-p-tolyl 2-fluoroethyl phosphite
Tricyclohexyl phosphite
Tribiphenylyl phosphite
Tris(4-methylcyclohexyl) phosphite
Amyl cyclopentyl phenyl phosphite
Diphenyl octadecyl phosphite
Dimethyl pentachlorophenyl phosphite Esters of phosphonous acids are likewise useful in the preparation of the presently useful 1:1 adducts or in reaction with the diketone and the hydrogen donor to give the oxo phosphonates. Such esters have the formula

wherein R is the hydrocarbyl or halohydrocarbyl radical herein defined, e.g., diphenyl phenylphosphonite, 2-chloroethyl 2-ethylhexyl β-naphthylphosphonite, diethyl butylphosphonite, cyclohexyl phenyl cyclohexylphosphonite, dibenzyl 2,4-dichlorophenylphosphonite, etc.

Esters of phosphinous acid likewise form adducts with the α-diketones. Examples of useful phosphinites include methyl dimethylphosphinite, p-tolyl diphenylphosphinite, naphthyl dicyclohexylphosphinite, amyl (propyl)dodecylphosphinite, etc. Treatment of the phosphinite-diketone adducts with a hydrogen donor results in the production of oxo phosphinates, e.g., according to the scheme:

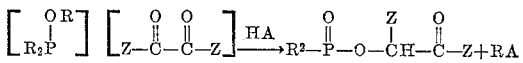

where R is the hydrocarbon radical herein defined and HA denotes the hydrogen donor.

The present invention thus provides dihydrocarbyl 2-oxoalkyl phosphates from the α-diketones and phosphites, hydrocarbyl 2-oxoalkyl hydrocarbylphosphonates from α-diketones and phosphonites and 2-oxoalkyl dihydrocarbylphosphinates from α-diketones and phosphinites. Examples of the oxo phosphorus esters and of the adducts from which they are prepared are shown in the following table:

| Adduct | Oxo phosphate |
|---|---|
| trimethyl phosphite—2,3-butanedione. | dimethyl 1-methyl-2-oxopropyl phosphate. |
| tris(2-chloroethyl) phosphite—3,4-hexanedione. | bis(2-chloroethyl) 1-ethyl-2-oxobutyl phosphate. |
| triethyl phosphite—4,5-octanedione. | diethyl 1-propyl-2-oxopentyl phosphate. |
| trihexyl phosphite—5,6-decanedione. | dihexyl 1-butyl-2-oxohexyl phosphate. |
| tris(2-ethylhexyl) phosphite—2,7-dimethyl-4,5-octanedione. | bis(2-ethylhexyl) 1-sec-butyl-4-methyl-2-oxopentyl phosphate. |
| triphenyl phosphite—2,3-butanedione. | diphenyl 1-methyl-2-oxopropyl phosphate. |
| tripentadecyl phosphite—1,4-diphenyl-2,3-butanedione. | dipentadecyl 1-benzyl-3-phenyl-2-oxopropyl phosphate. |
| triisopropyl phosphite—benzil. | diisopropyl 1,2-diphenyl-2-oxoethyl phosphate. |
| tributyl phosphite—p-anisil. | dibutyl 1,2-(p-methoxyphenyl)-2-oxoethyl phosphate. |
| triethyl phosphite—2,3-pentanedione. | diethyl 1-ethyl-2-oxopropyl phosphate and diethyl 1-methyl-2-oxobutyl phosphate. |
| trimethyl phosphite—2,3-octanedione. | dimethyl 1-pentyl-2-oxopropyl phosphate and dimethyl 1-methyl-2-oxoheptyl phosphate. |
| tris(2-chloroethyl) phosphite—1-phenyl-1,2-propanedione. | bis(2-chloroethyl) 1-phenyl-2-oxopropyl phosphate and bis(2-chloroethyl) 1-methyl-2-phenyl-2-oxoethyl phosphate. |
| trihexyl phosphite—2,3-undecanedione. | dihexyl 1-methyl-2-oxodecyl phosphate and dihexyl 1-octyl-2-oxopropyl phosphate. |
| tributyl phosphite—1-methoxy-2-methyl-3,4-hexanedione. | dibutyl 1-(1-methyl-2-methoxy)-ethyl-2-oxobutyl phosphate and dibutyl 1-ethyl-3-methyl-4-methoxy-2-oxobutyl phosphate. |
| trimethyl phosphite—3-cyclohexyl-1-phenyl-1,2-propanedione. | dimethyl 1-phenyl-3-cyclohexyl-2-oxopropyl phosphate and dimethyl 1-(cyclohexyl)methyl-2-phenyl-2-oxoethyl phosphate. |
| tris(2-chloroethyl) phosphite—4-methoxy-2'-chlorobenzil. | bis(2-chloroethyl) 1-(2-chlorophenyl)-2-(4-methoxyphenyl)-2-oxoethyl phosphate and bis(2-chloroethyl) 1-(4-methoxyphenyl)-2-(2-chlorophenyl)-2-oxoethyl phosphate. |
| diethyl butylphosphonite—2,3-butanedione. | ethyl 1-methyl-2-oxopropyl butylphosphonate. |
| diethyl phenylphosphonite—5,6-decanedione. | ethyl 1-butyl-2-oxohexyl phenylphosphonate. |
| diphenyl phenylphosphonite—2,3-butanedione. | phenyl 1-methyl-2-oxopropyl phenylphosphonate. |
| dihexyl phenylphosphonite—2,3-decanedione. | hexyl 1-methyl-2-oxononyl phenylphosphonate and hexyl 1-heptyl-2-oxopropyl phenylphosphonate. |
| diethyl phenylphosphonite—2,3-butanedione. | ethyl 1-methyl-2-oxopropyl phenylphosphonate. |
| phenyl diethylphosphinite—2,3-butanedione. | 1-methyl-2-oxopropyl diethylphosphinate. |
| n-octyl ethylmethylphosphinite—2,3-butanedione. | 1-methyl-2-oxopropyl ethylmethylphosphinate. |

Reaction of the above-described diketones and phosphorus esters for preparation of the presently useful adducts is effected by simply mixing the two reactants at ordinary, decreased or increased temperature and allowing the resulting reaction mixture to stand until formation of the 1:1 adduct of the two components. Generally, the reaction is moderately exothermic; hence, no external heating need be customarily employed. This is particularly true when the carbonyl compound is a low-molecular weight diketone, and the phosphorus compound is a lower trialkyl phosphite. With such reactants, application of cooling is usually advantageous in order to obtain smooth reaction. When working with such active α-diketones and/or phosphorus esters, optimum conditions comprise gradual addition of the diketone to the phosphorus ester with application of external cooling and thorough stirring. Operation in an inert atmosphere, e.g., nitrogen, is often advantageous. Usually it suffices to maintain the reaction temperature at, say, from 5° C. to 50° C., during addition of the diketone. When all of the carbonylic compound has been added to the trivalent phosphorus compound and there is no longer any evidence of exothermic reaction, completion of the reaction may be assured by heating the reaction mixture to a temperature of from, say, 50° C. to 100° C. With the more sluggish carbonylic compounds, e.g., the high-molecular weight aliphatic diketones, it may be necessary to heat the reaction mixture moderately, say, to a temperature of about 50° C., before an exothermic reaction is initiated. Since reactivity of the various dicarbonylic compounds and of the various trivalent phosphorus esters is thus known to vary, it is recommended that in each initial run the diketone compound and the phosphorus compound be mixed gradually at low temperatures and that external heating be employed only when there appears to be no spontaneous increase in temperature as a consequence of the mixing. Reaction of the carbonylic compound with the trivalent phosphorus ester takes place readily in the absence of an inert diluent or catalyst. However, catalysts and diluents or solvents may be employed. The use of diluents may be particularly advantageous when working with the more reactive diketones; such dilents may be, e.g., benzene, toluene, dioxane, methylene chloride, or hexane. When employing no diluent and using substantially the stoichiometric proportion of reactants, i.e., one molar equivalent of the phosphorus ester and one molar equivalent of the carbonylic compound, the reaction product may be used directly for a variety of industrial and agricultural purposes without purification, i.e., it consists essentially of the 1:1 adduct. When an excess of either the dicarbonylic compound or the trivalent phosphorus ester is employed, said excess can be readily recovered from the reaction product, e.g., by distillation. In order to assure complete participation of the generally less readily available dicarbonylic compound, an excess of the latter may be advantageously employed.

Hydrogen donors which are useful for converting the diketone-trivalent phosphorus ester adducts to the presently provided oxo phosphates, phosphonates and phosphinates are proton sources, generally. Particularly useful are water; inorganic mineral acids such as hydrochloric, sulfuric and phosphoric acid; fatty acids of from 1 to 5 carbon atoms such as formic, acetic, propionic, butyric and valeric acid; and benzenoid mono-carboxylic acids of from 7 to 10 carbon atoms such as benzoic acid, o-, m- or p-toluic acid, the dimethyl- and trimethyl-benzoic acids, the ethylbenzoic acids, the isopropylbenzoic acids, the butylbenzoic acids and the pentylbenzoic acids.

Conversion of the 1:1 adducts prepared as described above to the oxo phosphorus esters takes place by simply treating the adducts with the hydrogen donor at ordinary or moderately increased temperatures. Since the reaction is generally exothermic, extraneous heating is usually not required; but in some instances, particularly when reaction heat is not apparent upon addition of the water, heating may be employed to assure completion of the reaction. Temperatures of up to, say, from 70° C. to 100° C., may then be used, and extraneous, inert solvents or diluents, e.g., benzene or hexane, may or may not be employed. The crude reaction mixture comprising the oxo phosphorus esters and the by-product hydroxy compound or ester, depending upon the nature of the hydrogen donor, can be used as such for a variety of industrial and agricultural purposes, e.g., as a biological toxicant. But, if desired, the substantially pure oxo ester is readily separated from the by-product by conventional isolating procedures, e.g., by distillation, solvent extraction, etc.

The present oxo phosphorus esters are stable, well-characterized compounds which range from viscous oils to semisolids or solid crystalline compounds, depending upon the molecular weight thereof. They are advantageously used for a variety of commercial and industrial purposes, e.g., as lubricant additives, plasticizers for synthetic resins and plastics, as flame-proofing agents for textiles and other fibrous materials and as fire retardants for synthetic resins and plastics, such as the phenol formaldehyde resins; as additives to hydrocarbon fuels for the purpose of, e.g., imparting optimum ignition properties to gasolines, and anti-fouling characteristics to motor fuels in general.

The presently provided oxo phosphorus esters are also valuable for a variety of agricultural purposes and they are particularly useful as pre-emergent herbicides having selective action. Thus, for example, pre-emergent application of diethyl 1-methyl-2-oxopropyl phosphate at a rate of 25 lbs. per acre results in substantially complete suppression of crab grass while affecting only slightly the other narrow-leaved plants such as barnyard grass and rye grass, and having no phytotoxic effect on the broad-leaved plants such as sugar beet, morning glory, and radish or mustard.

Alternatively, as is shown in Example 5, some of the present oxo esters are also obtainable by catalytic rearrangement of 1-hydroxy-2-oxoalkyl phosphonates, substantially according to the scheme:

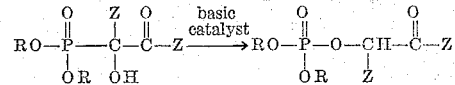

wherein R and Z are as herein defined. Such rearrangements are effected by treating the hydroxy oxo phosphonates at ordinary, decreased, or moderately increased temperature with a catalytic quantity of an inorganic or organic basic material such as the alkali metals and the alkali metal hydroxide, alkoxides, or hydrides or the organic quaternary ammonium compounds, e.g., sodium, potassium, lithium, sodium methoxide, potassium butoxide, sodium hydride, lithium hydride, sodium hydroxide, trimethylbenzylammonium hydroxide, etc.

The invention is further illustrated, but not limited, by the following examples:

*Example 1*

To 102.3 g. (0.33 mole) of triphenyl phosphite there was added, during about 10 minutes, 43.1 g. (0.5 mole) of 2,3-butanedione. The whole was then stirred at room temperature for 0.5 hour, during which time the reaction mixture rose to 27° C. It was then heated for 1.75 hours at 88° C., cooled to 70° C., placed under water-pump vacuum and heated to 100° C. in order to remove the excess dione. It was then concentrated to 100° C./2.5 mm. A total of 14.6 g. of the dione was recovered during both evacuations. Since the excess of 2,3-butanedione which was actually employed was 14.7 g., the reaction apparently went to completion. There was thus obtained as residue 131.3 g. (100% theoretical yield) of the substantially pure 1:1 triphenyl phosphite—2,3-butanedione adduct, $n_D^{25}$ 1.5628.

The above adduct was converted to the oxo phosphate as follows: A portion (52 g., 0.131 mole) of the adduct was charged to a flask equipped with stirrer, thermometer, a condenser fitted with a drying tube, and a dropping funnel, and 2.4 g. of water was added thereto, dropwise. Addition of the water was initiated at room temperature, employing a water bath for cooling. By the time all of the water had been added, the temperature of the reaction mixture rose to 43° C. The mixture was then heated to 70° C. in order to insure complete reaction. Distillation of the product to remove material boiling below 58–68° C./1.5–3.5 mm., gave as residue the substantially pure diphenyl 1-methyl-2-oxopropyl phosphate.

*Example 2*

2,3-butanedione (9.7 g., 0.112 mole) was added, during about 6 minutes, to 20 g. (0.112 mole) of diethyl butylphosphonite in a nitrogen atmosphere. Addition of the dione was initiated at room temperature, but ice-cooling was applied when the temperature of the reaction mixture reached 42° C., and the remainder of the dione was added while maintaining the temperature at below 30° C. The whole was then heated to 50° C. and distilled to give 26.5 g. (89.2% theoretical yield) of the substantially pure 1:1 diethyl butylphosphonite—2,3-butanedione adduct, B.P. 62–63° C./0.15 mm., $n_D^{25}$ 1.4409, and analyzing as follows:

|  | Found | Calcd. for $C_{12}H_{25}O_4P$ |
|---|---|---|
| Percent C | 54.35 | 54.49 |
| Percent H | 9.44 | 9.51 |
| Percent P | 11.55 | 11.71 |

Conversion of the above adduct to the oxo phosphonate was effected by gradually adding to 5 g. (0.019 mole) of the adduct, 0.35 g. (0.019 mole) of water. Addition of the water was conducted in a nitrogen atmosphere. After stirring the reaction mixture for a few minutes, an exothermic reaction occurred whereby the temperature rose from 26° C. to 42° C. before leveling off. Distillation of the product gave 3.8 g. of the substantially pure, colorless ethyl 1-methyl-2-oxopropyl butylphosphonate, B.P. 88–89° C./0.2 mm., $n_D^{25}$ 1.4321, which analyzed as follows:

|  | Found | Calcd. for $C_{10}H_{21}O_4P$ |
|---|---|---|
| Percent C | 50.91 | 50.85 |
| Percent H | 8.82 | 8.93 |
| Percent P | 12.92 | 13.11 |

Example 3

2,3-butanedione (17.2 g., 0.2 mole) was added, during 6 minutes, to 39.6 g. (0.2 mole) of diethyl phenylphosphonite while maintaining the temperature of the reaction mixture below 30° C. The whole was then heated to 75° C. in order to insure complete reaction and distilled to give 51.5 g. (90.7% theoretical yield) of the substantially pure 1:1 diethyl phenylphosphonite—2,3-butanedione adduct, B.P. 110–111° C./0.2 mm., $n_D^{25}$ 1.5022.

A portion (18.2 g., 0.064 mole) of the adduct was converted to the oxo phosphonate by adding, dropwise, thereto in a nitrogen atmosphere, 1.15 g. of water. The temperature of the reaction mixture rose from 15 to 35° C., and when no further exothermic reaction was evidenced, the whole was heated to 70° C. Distillation of the product gave 11.0 g. of the substantially pure, colorless ethyl 1-methyl-2-oxopropyl phenylphosphonate, B.P. 122–123° C./0.15 mm., which analyzed as follows:

|  | Found | Calcd. for $C_{12}H_{17}O_4P$ |
|---|---|---|
| Percent C | 56.27 | 56.22 |
| Percent H | 6.52 | 6.69 |
| Percent P | 12.13 | 12.09 |

Example 4

To 105 g. (0.5 mole) of benzil, dissolved in about 200 ml. of methylene chloride, there was added, dropwise during 25 minutes, 62 g. (0.5 mole) of trimethyl phosphite. The temperature of the reaction mixture during addition of the phosphite was maintained at 15–25° C. by occasional cooling. When all of the phosphite had been added, the reaction mixture was heated to reflux for 15 minutes in order to insure complete reaction. The product comprising the 1:1 trimethyl phosphite-benzil adduct in methylene chloride solution was converted to the oxo phosphate as follows:

After cooling to room temperature, 9.0 g. (0.5 mole) of water was added, dropwise during a time of 2 minutes. For about 5 minutes there was no apparent reaction; then, the temperature rose sharply to reflux. After it had decreased to 36° C., about another gram of water was added to insure complete reaction. The whole was then placed under water-pump vacuum and warmed to 65° C. in order to remove the solvent and the by-product methanol. Concentration of the residue to 95° C./3.0 mm. gave 155.4 g. (96.8% theoretical yield) of the substantially pure, viscous dimethyl 1,2-diphenyl-2-oxoethyl phosphate, which analyzed as follows:

|  | Found | Calcd. for $C_{16}H_{17}O_5P$ |
|---|---|---|
| Percent C | 59.69 | 59.91 |
| Percent H | 5.37 | 5.34 |
| Percent P | 9.85 | 9.65 |

Example 5

2,3-butanedione (119 g., 1.38 moles) was gradually added to 230 g. (1.38 moles) of triethyl phosphite, at a temperature of 20–35° C. After warming the whole to 60° C., and cooling with stirring in a nitrogen atmosphere, there was obtained 348.8 g. (100% theoretical yield) of the 1:1 triethyl phosphite—2,3-butanedione adduct.

A portion (63.1 g., 0.25 mole) of the adduct was converted to the oxo phosphate by adding thereto, dropwise, 5.0 g. (0.251 mole) of water at a temperature of 25° C. There seemed to be no heat of reaction during addition of the water, but shortly thereafter the temperature rose spontaneously to 70° C. before the increase could be controlled by cooling. The whole was then stirred at room temperature until no further reaction was apparent. Distillation gave 39.0 g. of the substantially pure diethyl 1-methyl-2-oxopropyl phosphate, B.P. 87–90° C./0.15–0.2 mm., which analyzed as follows:

|  | Found | Calcd. for $C_8H_{17}O_5P$ |
|---|---|---|
| Percent C | 42.92 | 42.88 |
| Percent H | 7.83 | 7.63 |
| Percent P | 13.83 | 13.81 |

The diethyl 1-methyl-2-oxopropyl phosphate was also prepared by treating a portion of the triethyl phosphite—2,3-butanedione adduct prepared herein with anhydrous hydrogen chloride. This was done by bubbling the hydrogen chloride through 63.1 g. (0.25 mole) of the adduct for about 30 minutes while maintaining the temperature of the reaction mixture below 35° C., heating the resulting mixture to 60° C. (whereby about 8 g. of ethyl chloride was collected in the cold trap) and twice repeated distillation of the residue to give the substantially pure diethyl 1-methyl-2-oxopropyl phosphate, B.P. 91–94° C./0.7–0.8 mm., analyzing 42.97% carbon, 7.73% hydrogen and 14.01% phosphorus.

The presently provided oxo phosphates can also be prepared by the catalytic rearrangement of certain hydroxy oxo phosphonates. The diethyl 1-methyl-2-oxopropyl phosphate of this example was prepared also by a catalytic procedure, substantially according to the scheme:

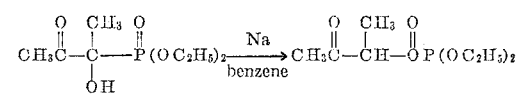

The rearrangement was effected as follows:

To 0.5 g. (0.02 mole) of elemental sodium in 75 ml. of dry benzene, there was added, dropwise during about 10 minutes, 44.9 g. (0.2 mole) of the diethyl 1-hydroxy-1-methyl-2-oxopropyl phosphonate. Addition of the phosphonate was initiated at a temperature of 25° C., but because the temperature soon rose to 35° C., cooling was applied intermittently to maintain the reaction temperature at below 30° C. When all of the phosphonate had been added, the whole was heated to 50° C., cooled and filtered and the filtrate distilled to give 31.2 g. of the diethyl 1-methyl-2-oxopropyl phosphate, B.P. 88–90° C./0.15–0.2 mm.

Example 6

2,3-butanedione (140.2 g., 1.61 moles) was added, dropwise during one hour, to 416.5 g. (2.0 moles) of triisopropyl phosphite which had been cooled to 7° C. Extraneous cooling was employed during the addition. When all of the dione had been added, the whole was stirred at room temperature for 15 minutes and then heated to 80° C. in order to insure complete reaction. Distillation of the resulting product gave 414.9 g. of the substantially pure 1:1 triisopropyl phosphite—2,3-butanedione adduct, B.P. 49–61° C./0.2 mm. Refractionation gave 313.4 g. of a purer product, B.P. 59–61° C./0.2 mm., $n_D^{25}$ 1.4249, which analyzed as follows:

|  | Found | Calcd. for $C_{13}H_{27}O_5P$ |
| --- | --- | --- |
| Percent C | 53.05 | 53.02 |
| Percent H | 9.15 | 9.24 |
| Percent P | 10.33 | 10.52 |

A portion (88.2 g., 0.30 mole) of the above adduct, B.P. 59–61° C./0.2 mm., was converted to the oxo phosphate by adding thereto, during about 6 minutes, 5.6 g. (0.31 mole) of water. Within about 12 minutes, the temperature of the reaction mixture rose spontaneously to a maximum temperature of 42° C.; the whole was then stirred for one hour as it cooled to room temperature. Distillation gave the substantially pure diisopropyl 1-methyl-2-oxopropyl phosphate, B.P. 83–84° C./0.3 mm., $n_D^{25}$ 1.4159, and analyzing as follows:

|  | Found | Calcd. for $C_{10}H_{21}O_5P$ |
| --- | --- | --- |
| Percent C | 47.64 | 47.59 |
| Percent H | 8.38 | 8.37 |
| Percent P | 12.50 | 12.27 |

Example 7

This example describes preparation of diisopropyl 1-methyl-2-oxopropyl phosphate from 2,3-butanedione, water, and triisopropyl phosphite, i.e., it shows the reaction of an intermediately formed, unisolated triisopropyl phosphite: 2,3-butanedione adduct with water.

To a mixture consisting of 34.5 g. (0.4 mole) of the dione and 7.3 g. (0.4 mole) of water, there was added, dropwise during 15 minutes, 83.3 g. (0.4 mole) of the phosphite. The addition was made at 20–30° C., using an ice bath for occasional cooling in order to maintain the temperature of the reaction mixture within these limits. When all of the phosphite had been added, the mixture was stirred until no further reaction, as evidenced by temperature rise, was apparent. It was then heated to 80° C., subjected to water-pump vacuum to remove by-product isopropanol and the residue distilled to give a fraction, B.P. 86–100° C./0.1 mm., which upon redistillation gave the substantially pure diisopropyl 1-methyl-2-oxopropyl phosphate, B.P. 76–78° C./0.05 mm., $n_D^{25}$ 1.4190, which analyzed as follows:

|  | Found | Calcd. for $C_{10}H_{21}O_5P$ |
| --- | --- | --- |
| Percent C | 47.75 | 47.59 |
| Percent H | 8.21 | 8.37 |
| Percent P | 12.01 | 12.27 |

Example 8

This example also shows preparation of diisopropyl 1-methyl-2-oxopropyl phosphate without isolation of an intermediately formed 1:1 dione-phosphite adduct. In this instance, it was effected by contacting the dione with the phosphite in the presence of the glacial acetic acid, which served to convert the adduct to the phosphate as soon as it was formed.

To a mixture consisting of 34.5 (0.4 mole) of 2,3-butanedione and 24.8 g. (0.4 mole) of glacial acetic acid, there was added, during 15 minutes, 83.3 g. (0.4 mole) of triisopropyl phosphite. During addition of the phosphite, the temperature of the reaction mixture was maintained at 20–30° C. by cooling. When all of the phosphite had been added, the whole was stirred until cessation in temperature rise, heated to 80° C., and placed under water-pump vacuum to remove by-product isopropyl acetate. Distillation of the residue gave 70.0 g. of the substantially pure diisopropyl 1-methyl-2-oxopropyl phosphate, B.P. 74–76° C./0.05 mm., analyzing as follows:

|  | Found | Calcd. for $C_{10}H_{21}O_5P$ |
| --- | --- | --- |
| Percent C | 47.67 | 47.59 |
| Percent H | 8.41 | 8.37 |
| Percent P | 12.48 | 12.27 |

Example 9

2,3-butanedione (43.1 g., 0.5 mole) was added, dropwise during 15 minutes, to 62 g. (0.5 mole) of trimethyl phosphite. Occasional cooling was applied to maintain the temperature of the reaction mixture at 20–30° C. When all of the dione had been added, the mixture was heated to 70° C. to insure complete reaction, and then allowed to cool to room temperature. To the cooled mixture, there was added 30.5 g. (0.5 mole) of glacial acetic acid during 12 minutes at 22–30° C. A mildly exothermic reaction occurred; and after addition of the acid was completed, stirring was continued until no further reaction was apparent. The whole was then heated to 60° C. to insure complete reaction and placed under water-pump vacuum to remove the by-product methyl acetate, which was collected in the cold trap. Distillation of the residue gave 85.0 g. (86.6% theoretical yield) of the substantially pure dimethyl 1-methyl-2-oxopropyl phosphate, B.P. 80–81° C/.0.1 mm., which analyzed as follows:

|  | Found | Calcd. for $C_6H_{13}O_5P$ |
| --- | --- | --- |
| Percent C | 36.51 | 36.78 |
| Percent H | 6.60 | 6.68 |
| Percent P | 15.89 | 15.78 |

Example 10

To 54.1 g. (0.25 mole) of methyl diphenylphosphinite there was added, during 15 minutes, 21.6 g. (0.25 mole) of 2,3-butanedione. Upon adding the first few mls. of the dione, the temperature rose rapidly from 23° C. to 33° C., so the remainder of the addition was made at 20–30° C. using an ice-bath for cooling. The whole was then stirred until no further reaction was apparent. It was then heated to 50° C., and concentrated to 75° C./0.01 mm., to obtain as residue 75.2 g. (99.4% theoretical yield) of the substantially pure 1:1 methyl diphenylphosphinite—2,3-butanedione adduct.

Conversion of the above adduct to the oxophosphinate was conducted by adding, dropwise, to 25.8 g. (0.085 mole) of the adduct, 6.0 g. (0.1 mole) of glacial acetic acid. The addition was started at room temperature (24° C.), but since the temperature rose rapidly to 40° C., the remainder of the addition was made using water-bath cooling in order to maintain the temperature at below 40° C. The whole was then heated to 50° C. to insure complete reaction, allowed to cool to room temperature, and then concentrated to 60° C./1.5 mm. By-product methyl acetate collected in the Dry-Ice trap during the latter step, and there was obtained as residue 24.4 g. (99.3% theoretical yield) of the substantially pure 1-methyl-2-oxopropyl diphenylphosphinate.

What we claim is:

1. An alkyl 2-oxoalkyl alkylphosphonate wherein each alkyl radical has from 1 to 12 carbon atoms.

2. A 2-oxoalkyl dialkylphosphinate wherein each alkyl radical has from 1 to 12 carbon atoms.

3. Ethyl 1-methyl-2-oxopropyl butylphosphonate.

4. Ethyl 1-methyl-2-oxopropyl phenylphosphonate.

5. 1-methyl-2-oxopropyl diphenylphosphinate.

6. The method which comprises contacting with a hydrogen donor an adduct of the formula

in which R is selected from the class consisting of alkyl, aryl, aralkyl and alkaryl radicals of from 1 to 12 carbon atoms, Z is selected from the class consisting of alkyl, aryl, aralkyl and alkaryl radicals of from 1 to 12 carbon atoms, and X and Y are selected from the class consisting of R and OR, and recovering from the resulting reaction product an oxo phosphorus ester of the formula

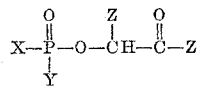

in which X, Y and Z are as herein defined.

7. The method which comprises contacting an adduct of the formula

in which R is selected from the class consisting of alkyl, aryl, aralkyl and alkaryl radicals of from 1 to 12 carbon atoms, Z is selected from the class consisting of alkyl, aryl, aralkyl and alkaryl radicals of from 1 to 12 carbon atoms, and X and Y are selected from the class consisting of R and OR, with a hydrogen donor selected from the class consisting of inorganic mineral acids, fatty acids of from 1 to 5 carbon atoms, benzenoid mono-carboxylic acids of from 7 to 10 carbon atoms and water, and recovering from the resulting reaction product an oxo phosphorus ester of the formula

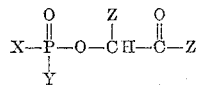

in which X, Y and Z are as herein defined.

8. The method which comprises contacting with an inorganic mineral acid an adduct of the formula

in which R is selected from the class consisting of alkyl, aryl, aralkyl and alkaryl radicals of from 1 to 12 carbon atoms, Z is selected from the class consisting of alkyl, aryl, aralkyl and alkaryl radicals of from 1 to 12 carbon atoms, X and Y are selected from the class consisting of R and OR, and recovering from the resulting reaction product an oxo phosphorus ester of the formula

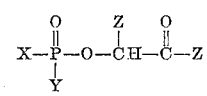

in which X, Y and Z are as herein defined.

9. The method which comprises contacting with water an adduct of the formula

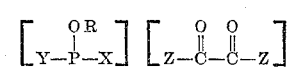

in which R is selected from the class consisting of alkyl, aryl, aralkyl and alkaryl radicals of from 1 to 12 carbon atoms, Z is selected from the class consisting of alkyl, aryl, aralkyl and alkaryl radicals of from 1 to 12 carbon atoms, X and Y are selected from the class consisting of R and OR, and recovering from the resulting reaction product an oxo phosphorus ester of the formula

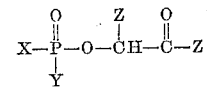

in which X, Y and Z are as herein defined.

10. The method which comprises contacting with a fatty acid of from 1 to 5 carbon atoms an adduct of the formula

in which R is selected from the class consisting of alkyl, aryl, aralkyl and alkaryl radicals of from 1 to 12 carbon atoms, Z is selected from the class consisting of alkyl, aryl, aralkyl and alkaryl radicals of from 1 to 12 carbon atoms, X and Y are selected from the class consisting of R or OR, and recovering from the resulting reaction product an oxo phosphorus ester of the formula

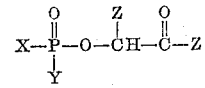

in which X, Y and Z are as herein defined.

11. The method which comprises contacting an adduct of the formula

in which R is selected from the class consisting of alkyl, aryl, aralkyl and alkaryl radicals of from 1 to 12 carbon atoms, Z is selected from the class consisting of alkyl, aryl, aralkyl and alkaryl radicals of from 1 to 12 carbon atoms, and X and Y are selected from the class consisting of R and OR, with a carboxylic acid selected from the class consisting of fatty acids of from 1 to 5 carbon atoms and of benzenoid mono-carboxylic acids of from 7 to 10 carbon atoms and recovering from the resulting reaction product an ester of the formula TCOOR wherein TCOO— denotes the acid residue of said carboxylic acid and R is as herein defined.

12. The method which comprises contacting with water the 1:1 adduct of triphenyl phosphite and 2,3-butanedione and recovering diphenyl 1-methyl-2-oxopropyl phosphate from the resulting reaction product.

13. The method which comprises contacting with water the 1:1 adduct of diethyl butylphosphonite and 2,3-butanedione and recovering ethyl 1-methyl-2-oxopropyl butylphosphonate from the resulting reaction product.

14. A compound of the formula

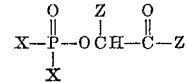

in which Z is selected from the class consisting of alkyl, aryl, aralkyl and alkaryl radicals of from 1 to 12 carbon atoms and X is selected from the class consisting of Z and —OZ.

15. The method which comprises contacting with water the 1:1 adduct of diethyl phenylphosphonite and 2,3-butanedione and recovering ethyl 1-methyl-2-oxopropyl phenylphosphonate from the resulting reaction product.

16. The method which comprises contacting with water the 1:1 adduct of trimethyl phosphite and benzil and recovering dimethyl 1,2-diphenyl-2-oxoethyl phosphate from the resulting reaction product.

17. The method which comprises contacting with water the 1:1 adduct of triethyl phosphite and 2,3-butanedione and recovering diethyl 1-methyl-2-oxopropyl phosphate from the resulting reaction product.

18. The method which comprises contacting with hydrogen chloride the 1:1 adduct of triethyl phosphite and 2,3-butanedione and recovering diethyl 1-methyl-2-oxopropyl phosphate from the resulting reaction product.

19. The method which comprises contacting with water the 1:1 adduct of triisopropyl phosphite and 2,3-butanedione and recovering diisopropyl 1-methyl-2-oxopropyl phosphate from the resulting reaction product.

20. The method which comprises contacting with acetic acid the 1:1 adduct of trimethyl phosphite and 2,3-butanedione and recovering dimethyl 1-methyl-2-oxopropyl phosphate from the resulting reaction product.

21. The method which comprises contacting with acetic acid the 1:1 adduct of methyl diphenylphosphinite and 2,3-butanedione and recovering 1-methyl-2-oxopropyl diphenylphosphinate from the resulting reaction product.

22. The method which comprises contacting in the presence of a hydrogen donor a diketone of the formula

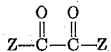

in which Z is selected from the class consisting of alkyl, aryl, aralkyl and alkaryl radicals of from 1 to 12 carbon atoms, with a trivalent phosphorus ester of the formula

in which R is selected from the class consisting of alkyl, aryl, aralkyl and alkaryl radicals of from 1 to 12 carbon atoms, X and Y are selected from the class consisting of R and OR, and recovering from the resulting reaction product an oxo phosphorus ester of the formula

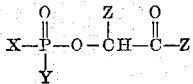

in which X, Y and Z are as herein defined.

23. The method which comprises contacting in the presence of water a diketone of the formula

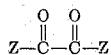

in which Z is selected from the class consisting of alkyl, aryl, aralkyl and alkaryl radicals of from 1 to 12 carbon atoms, with a trivalent phosphorus ester of the formula

in which R is selected from the class consisting of alkyl, aryl, aralkyl and alkaryl radicals of from 1 to 12 carbon atoms, X and Y are selected from the class consisting of R and OR, and recovering from the resulting reaction product an oxo phosporus ester of the formula

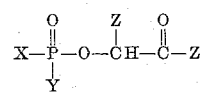

in which X, Y and Z are as herein defined.

24. The method which comprises contacting in the presence of a fatty acid of from 1 to 5 carbon atoms a diketone of the formula

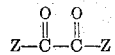

in which Z is selected from the class consisting of alkyl, aryl, aralkyl and alkaryl radicals of from 1 to 12 carbon atoms, with a trivalent phosphorus ester of the formula

in which R is selected from the class consisting of alkyl, aryl, aralkyl and alkaryl radicals of from 1 to 12 carbon atoms, X and Y are selected from the class consisting of R and OR, and recovering from the resulting reaction product an oxo phosphorus ester of the formula

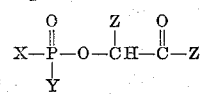

in which X, Y and Z are as herein defined.

25. The method which comprises contacting 2,3-butanedione with triisopropyl phosphite in the presence of acetic acid and recovering diisopropyl 1-methyl-2-oxopropyl phosphate from the resulting reaction product.

References Cited in the file of this patent

UNITED STATES PATENTS 2,230,120  Paist _____ Jan. 28, 1941

OTHER REFERENCES

Chemical Abstracts (I), vol. 52, page 7125d, 1958, article by Abramov et al.

Chemical Abstracts (II), vol. 52, page 8941, 1958, article by Abramov et al.

UNITED STATES PATENT OFFICE
CERTIFICATE OF CORRECTION

Patent No. 3,014,949                      December 26, 1961

Gail H. Birum et al.

It is hereby certified that error appears in the above numbered patent requiring correction and that the said Letters Patent should read as corrected below.

Column 4, in the table, column 1, under the heading "Adduct", line 22 thereof, for "tris(2-chloroethyl phosphite" read -- tris(2-chloroethyl) phosphite --; column 12, lines 52 to 55, the formula should appear as shown below instead of as in the patent:

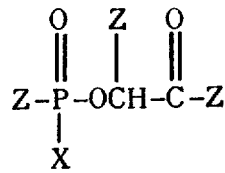

Signed and sealed this 28th day of August 1962.

(SEAL)
Attest:

ESTON G. JOHNSON                          DAVID L. LADD
Attesting Officer                       Commissioner of Patents